United States Patent
Eckert et al.

(10) Patent No.: US 9,251,069 B2
(45) Date of Patent: Feb. 2, 2016

(54) MECHANISMS TO BOUND THE PRESENCE OF CACHE BLOCKS WITH SPECIFIC PROPERTIES IN CACHES

(71) Applicant: Advanced Micro Devices, Inc., Sunnyvale, CA (US)

(72) Inventors: Yasuko Eckert, Kirkland, WA (US); Gabriel H. Loh, Bellevue, WA (US); Mauricio Breternitz, Austin, TX (US); James M. O'Connor, Austin, TX (US); Srilatha Manne, Portland, OR (US); Nuwan S. Jayasena, Sunnyvale, CA (US); Mithuna S. Thottethodi, West Lafayette, IN (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 255 days.

(21) Appl. No.: 14/055,869

(22) Filed: Oct. 16, 2013

(65) Prior Publication Data

US 2014/0181414 A1    Jun. 26, 2014

Related U.S. Application Data

(63) Continuation-in-part of application No. 13/725,011, filed on Dec. 21, 2012, now Pat. No. 9,075,730.

(51) Int. Cl.
G06F 12/08    (2006.01)

(52) U.S. Cl.
CPC ........ *G06F 12/0808* (2013.01); *G06F 12/0848* (2013.01); *G06F 12/0888* (2013.01)

(58) Field of Classification Search
CPC ............ G06F 12/0804; G06F 12/0808; G06F 12/0848; G06F 12/0888
See application file for complete search history.

(56) References Cited

U.S. PATENT DOCUMENTS

| | | | | |
|---|---|---|---|---|
| 5,751,946 A | * | 5/1998 | Afsar | G06F 9/3834 712/E9.048 |
| 5,928,365 A | * | 7/1999 | Yoshida | G06F 1/3225 365/222 |
| 2004/0117558 A1 | * | 6/2004 | Krick | G06F 12/0855 711/141 |
| 2005/0114605 A1 | * | 5/2005 | Iyer | G06F 12/0888 711/133 |
| 2008/0133876 A1 | * | 6/2008 | Kwon | G06F 1/3225 711/209 |
| 2014/0310552 A1 | * | 10/2014 | So | G06F 1/3275 713/324 |
| 2015/0039833 A1 | * | 2/2015 | Chang | G06F 12/122 711/129 |

* cited by examiner

*Primary Examiner* — Hiep Nguyen (74) *Attorney, Agent, or Firm* — Rory D. Rankin; Meyertons, Hood, Kivlin, Kowert & Goetzel, P.C.

(57) ABSTRACT

A system and method for efficiently limiting storage space for data with particular properties in a cache memory. A computing system includes a cache array and a corresponding cache controller. The cache array includes multiple banks, wherein a first bank is powered down. In response a write request to a second bank for data indicated to be stored in the powered down first bank, the cache controller determines a respective bypass condition for the data. If the bypass condition exceeds a threshold, then the cache controller invalidates any copy of the data stored in the second bank. If the bypass condition does not exceed the threshold, then the cache controller stores the data with a clean state in the second bank. The cache controller writes the data in a lower-level memory for both cases.

20 Claims, 7 Drawing Sheets

MECHANISMS TO BOUND THE PRESENCE OF CACHE BLOCKS WITH SPECIFIC PROPERTIES IN CACHES

CROSS REFERENCE TO RELATED APPLICATIONS

This application is a continuation-in-part and claims the benefit of U.S. application Ser. No. 13/725,011, filed Dec. 21, 2012, the entirety of which is incorporated herein by reference.

BACKGROUND

1. Field of the Invention

This invention relates to computing systems, and more particularly, to efficiently limiting storage space for data with particular properties in a cache memory.

2. Background

In various examples, a microprocessor is coupled to one or more levels of a cache hierarchy in order to reduce the latency of the microprocessor's request of data in memory for a read or a write operation. Generally, a cache stores one or more blocks, each of which is a copy of data stored at a corresponding address in the system memory. Since caches have finite sizes, the total number of cache blocks is inherently bounded. Additionally, there is a limit on the number of blocks that map to a given set in a set-associative cache. At times there are conditions that benefit from a finer limit on a number of cache blocks associated with a given cache property than a limit offered by the cache capacity or the cache associativity. Examples of the cache property include one or more of a coherence state, a dirty state, a source ownership state, a remote state that is used in a non-uniform memory access (NUMA) computing system, and so forth.

Providing the finer limit on the number of cache blocks associated with the given cache property reduces latencies for searching for the number of cache blocks and moving the number of cache blocks prior to setting the cache in a different state. In some examples, the different state is a low-power mode. Additionally, the finer limit reduces a number of conflict misses for a set-associative or a direct-mapped cache for both cache blocks with and without the cache property.

Further, the latency for the cache to transition to a given state, such as a low-power mode, is reduced with the finer limit. For example, to manage power consumption, chip-level and system-level power management systems typically disable portions of the chip or system when experiencing no utilization for a given time period. However, transitioning the cache to a low-power mode is delayed until the number of cache blocks associated with the cache property are evicted and written back to lower-level memory. Without the finer limit, the transition latency is too large. The large latency reduces both the benefits of the power management system and the number of times the transition actually occurs despite the power management system notifications.

To allocate space for new data to be stored in the cache, such as a cache line fill following a cache miss, a cache replacement algorithm selects a given way within a given set to be replaced. If this allocation strategy does not distinguish requests associated with the cache property, then the strategy allows a significant portion of the ways in the cache to be occupied with cache blocks associated with the cache property. Without the finer limit being utilized as previously described, operational latencies increase, conflict misses increase, and cache state transitions reduce.

In view of the above, efficient methods and systems for efficiently performing data allocation in a cache memory are desired.

SUMMARY OF EMBODIMENTS

Systems and methods for efficiently limiting storage space for data with particular properties in a cache memory are contemplated. In various embodiments, a computing system includes a cache array and a corresponding cache controller. The cache array includes multiple partitions. In various embodiments, the partitions are banks within the cache array. A first bank of the multiple banks is powered down. The cache controller receives a write request to a second bank of the multiple banks for data indicated to be stored in the powered down first bank. The cache controller determines a respective bypass condition for the data. The bypass condition is based on several criteria. Some examples of the criteria includes at least a static fraction of write requests having data bypass the second bank, a measured amount of memory access request traffic for the cache array, and a measured amount of memory access request traffic for lower-level memory coupled to the cache array and the cache controller.

The bypass condition is compared to a threshold. If the bypass condition does exceed the threshold, then the cache controller invalidates any copy of the data stored in the second bank. If the bypass condition does not exceed the threshold, then the cache controller stores the data with a clean, or non-dirty, state in the second bank. The cache controller writes the data in the lower-level memory for both cases. The lower-level memory is a lower-level cache or system memory.

These and other embodiments will be further appreciated upon reference to the following description and drawings.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENT(S)

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

It will be appreciated that for simplicity and clarity of illustration, elements shown in the figures have not necessarily been drawn to scale. For example, the dimensions of some of the elements are exaggerated relative to other elements.

Terminology. The following paragraphs provide definitions and/or context for terms found in this disclosure (including the appended claims):

In the detailed description that follows, references to "one embodiment," "an embodiment," "an example embodiment," etc., indicate that the embodiment described includes a particular feature, structure, or characteristic. However, it is to be understood that not every embodiment necessarily includes the particular feature, structure, mode of operation, or characteristic. Moreover, such phrases are not necessarily referring to the same embodiment. Alternate embodiments is devised without departing from the scope of the disclosure, and well-known elements of the disclosure may not be described in detail or is omitted so as not to obscure the relevant details. Further, when a particular feature, structure, or characteristic is described in connection with an embodiment, it is submitted that it is within the knowledge of one skilled in the art to affect such feature, structure, or characteristic in connection with other embodiments whether or not explicitly described. In addition, the description refers to particular embodiments as having particular characteristics or performing particular actions using terms such as "does", "is", "uses", "utilizes", or otherwise. However, it is to be understood that various embodiments do not have the described characteristics or perform the described actions. Rather, alternate embodiments are devised without departing from the scope of the disclosure as noted above.

In addition to the above, the terminology used herein is for the purpose of describing particular embodiments only and is not intended to be limiting of the disclosure. For example, as used herein, the singular forms "a," "an" and "the" are intended to include the plural forms as well, unless the context clearly indicates otherwise.

It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to. As used in the appended claims, these terms do not foreclose additional structure or steps. Consider a claim that recites: "A computing system comprising one or more processor cores . . . ." Such a claim does not foreclose the computing system from including additional components (e.g., a GPU, one or more memory devices).

"Configured To." Various units, circuits, or other components is described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in a manner that is capable of performing the task(s) at issue. "Configured to" also includes adapting a manufacturing process (e.g., a semiconductor fabrication facility) to fabricate devices (e.g., integrated circuits) that are adapted to implement or perform one or more tasks.

"Based On." As used herein, this term is used to describe one or more factors that affect a determination. This term does not foreclose additional factors that affect a determination. That is, a determination is solely based on those factors or based, at least in part, on those factors. Consider the phrase "determine A based on B." While B is a factor that affects the determination of A, such a phrase does not foreclose the determination of A from also being based on C. In other instances, A is determined based solely on B.

Figure 1:
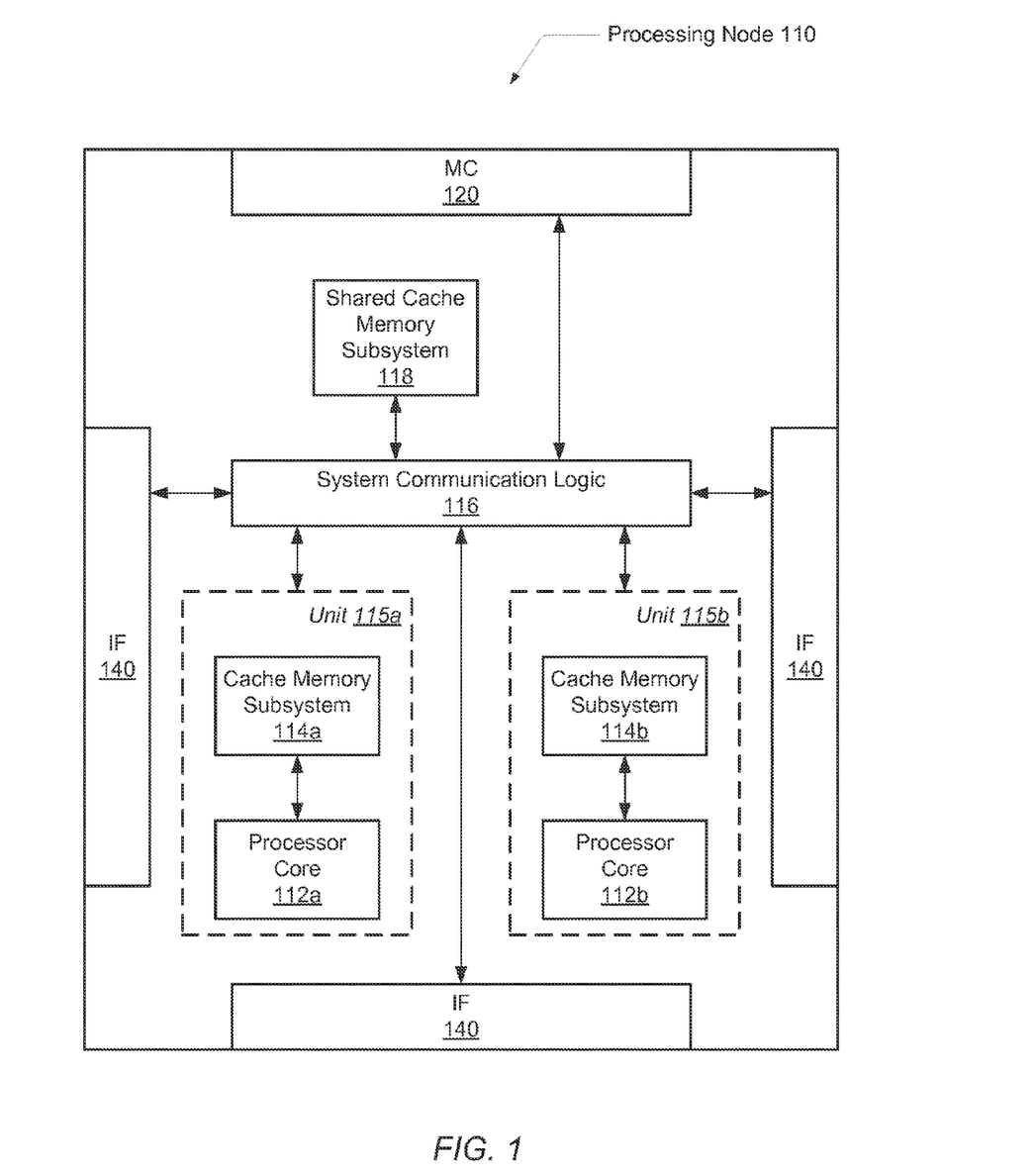
FIG. 1 is a generalized block diagram of one embodiment of a processing node.

Referring to FIG. 1, one embodiment of a processing node 110 is shown. Generally speaking, processing node 110 includes memory controller 120, interface logic 140, one or more processing units 115, which includes processor cores 112a-112b and corresponding cache memory subsystems 114a-114b; system communication logic 116, and a shared cache memory subsystem 118. In one embodiment, the illustrated functionality of processing node 110 is incorporated upon a single integrated circuit. In another embodiment, the illustrated functionality is incorporated in a chipset on a computer motherboard.

In one embodiment, processing node 110 is a stand-alone system within a mobile computer, a desktop, a server, or other. In other embodiments, processing node 110 is one node within a socket of a multi-socket system. In some embodiments, the processing units 115a-115b and one or more other sources outside of processing node 110 access the shared cache memory subsystem 118. The other sources include general-purpose processors and graphical processing units (GPU's) on other nodes, input/output (I/O) devices, and so forth. In other embodiments, another level of cache, such as caches 114a-114b, in the cache memory hierarchy is shared by multiple sources. Regardless of the level within the memory hierarchy, the shared cache is partitioned. The partition includes particular ways and/or sets of a set-associative cache, banks of a multi-bank cache, and so forth.

One or more caches of the caches 114a-114b and 118 is a partitioned cache. In some examples, the partition is a bank in a multi-bank cached. One or more partitions are designated for storing data of a given type. A data type may be simply referred to as a type. The type corresponds to a property of cached data. For example, the property or type includes a cache entry valid state, dirty and clean cache states, home or local node and remote node states, bank identifiers (ID's), such as bank IDs corresponding to local and one or more remote nodes; one of multiple cache coherence states, process or processor owner identifiers (ID's), thread ID's, system-level transaction ID's, shared and private states, instruction type and data type, and so forth. The property or type also includes a combination of two or more of the examples.

One or more of the caches 114a-114b and 118 has a limit on storage space for data with particular cache properties. The limit is enforced regardless of whether or not contention exists for allocating data with the particular cache properties. For example, if storage space is approaching the limit and an appreciable amount of storage space is free, the limit will still be enforced despite the available free storage space. A limit corresponds to a given partition of one of the caches 114a-114b and 118.

One or more sources generate memory requests for data of a first type. The one or more sources include the processing units 115a-115b, input/output (I/O) devices, processing units in other nodes, and so forth. In response to receiving a request to allocate data of the first type and determining the designated first partition for the first type is unavailable, the shared cache controller allocates the data of the first type in another partition different from the designated first partition. For example, the cache controller allocates the data of the first type in a second partition different from the first partition. This allocation occurs despite the designated earlier assignments. Alternatively, the cache controller allocates the data of the first type across multiple other available partitions different from the first partition.

In various embodiments, power management logic determines a first partition of multiple partitions in a given cache of the caches 114a-114b and 118 is to be powered down or otherwise made unavailable. The data in the first partition is then reallocated. For example, the clean cache lines in the first partition are invalidated and the dirty cache lines in the first partition are written back to lower-level memory. Following this, the first partition is powered down or made inactive. While the first partition is unavailable or inactive, a second partition, which is active, is assigned to handle access requests for data meant to be stored in the first partition based on cache data property type.

Continuing with the above example, the cache controller for the given cache maintains only clean cache lines for data of a first type. Data of the first type is meant to be stored in the first partition, which is inactive. In response to receiving a write access request for data of the first type, the cache controller invalidates any copy of the data of the first type stored in the second partition. Following, the cache controller bypasses the second partition and sends the write access request to lower-level memory. Alternatively, the cache controller stores the modified data of the first type in the second partition in a clean state. The clean state indicates a copy of data in each of the second partition and the lower-level memory is the same. Following, the cache controller writes through the second partition and sends the write access request to lower-level memory.

The decision to bypass or write through the second partition while servicing the received write access request for data of the first type is based on several criteria. The criteria includes one or more of a static fraction of requests to bypass, a measured amount of memory access request traffic for the given cache, a measured amount of memory access request traffic for the lower-level memory, an access miss rate for data of the first type, and so forth. The memory access request traffic for either the given cache or the lower-level memory includes a number of received memory access requests, an amount of data utilized by the memory access requests, memory bus utilization, other factors, or a combination of two or more of these factors. Any static fractions and thresholds used in the selection logic are stored in a respective one of multiple configuration and status registers (CSR's).

In various embodiments, the fraction values are static values until they are reprogrammed. In other embodiments, the fraction values are dynamic and dependent on other thresholds, values, or measurements that vary over time. In several examples, these stored fraction values and thresholds are programmable. Alternatively, any static fractions and thresholds are stored or utilized in a non-programmable manner, such as being stored in a read-only memory (ROM), being implemented in a circuit or control logic, being hard-wired to given values, and so forth. Before providing more details, a further description of the components in the processor 100 is given.

Processor cores 112a-112b include circuitry for executing instructions according to a predefined instruction set. Although two processor cores are shown in FIG. 1, the processing node 110 may include another number of processor cores, such as a single processor core, four processor cores, and so forth. The x86® instruction set architecture (ISA) is selected. Alternatively, the x86-64®, Alpha®, PowerPC®, MIPS®, SPARC®, PA-RISC®, or any other instruction set architecture is selected. Generally, processor cores 112a-112b access the cache memory subsystems 114a-114b, respectively, for data and instructions. As used herein, the term "access" regarding a cache memory subsystem refers to performing a read or a write request operation that results in a cache hit if the requested data of a corresponding request address resides in the cache or a cache miss if it does not reside in the cache.

If a cache miss occurs, such as a requested block not being found in a respective one of the cache memory subsystems 114a-114b or in shared cache memory subsystem 118, then a read request is generated and transmitted to the memory controller 120 within the node 110 to which the missing block is mapped. A corresponding cache fill line with the requested block is then conveyed to the corresponding cache in order to complete the original read or write request. In addition, the cache fill line is placed within a corresponding set within the cache. If there are no available ways within the corresponding set, then typically a Least Recently Used (LRU) algorithm determines which way within the set is to have its data evicted and replaced by the cache fill line data. As used herein, the term "allocate" refers to storing a cache fill line fetched from a lower level of the cache hierarchy into a way of a particular cache subsequent a cache miss to the particular cache.

As used herein, a "block" is a set of bytes stored in contiguous memory locations, which are treated as a unit for coherency purposes. As used herein, the terms "cache block", "block", "cache line", and "line" are interchangeable. In some embodiments, a block is also the unit of allocation and deallocation in a cache. The number of bytes in a block is varied according to design choice, and is of any size. As an example, 32 byte and 64 byte blocks are often used.

Cache subsystems 114a-114b and 118 comprise high-speed cache memories or arrays configured to store blocks of data. A corresponding cache controller is coupled to the cache arrays. The cache controller includes programmable configuration and status registers (CSRs) and control logic. The CSR's and the control logic is used to limit an amount of data of a given type to be stored in the cache or in at least one partition of the cache. In various embodiments, the CSR's also store static fractions and thresholds used to select between bypassing and writing through data of a given type when a corresponding write access request is received. Cache memory subsystems 114a-114b are implemented as a hierarchy of caches. In one embodiment, cache memory subsystems 114a-114b each represent L2 cache structures, and shared cache subsystem 118 represents an L3 cache structure. An L1 cache structure is integrated within each of the processor cores 112a-112b. Other embodiments are possible and contemplated.

Data already presently stored in the cache is hit for a read or a write access by any source despite the values stored in the CSR's. For example, the cache may have modified data, and, therefore, lower levels of the memory hierarchy may have corresponding stale data. The requesting source should receive the updated copy of the requested cache line. Therefore, for a particular way within a particular set of a shared cache, an access from any source is still permitted. However, allocation due to a cache miss is determined by the availability of any partitions within the cache and values, such as a limit, stored in the CSRs.

Memory controller 120 is used to connect the processor 100 to off-die memory. Memory controller 120 comprises control circuitry for interfacing to memories. Memory controller 120 follows memory channel protocols for determining values used for information transfer, such as a number of data transfers per clock cycle, signal voltage levels, signal timings, signal and clock phases and clock frequencies. Additionally, memory controller 120 includes request queues for queuing memory requests. The off-die memory includes one of multiple types of dynamic random access memories (DRAMs). The DRAM is further connected to lower levels of a memory hierarchy, such as a disk memory and offline archive memory.

The interface 140 includes integrated channel circuitry to directly link signals to other processing nodes, which include another processor. The interface 140 utilizes one or more coherence links for inter-node access of processor on-die caches and off-die memory of another processing node. Examples of the technology include HyperTransport and QuickPath. The input/output (I/O) interface 142 generally provides an interface for I/O devices off the processor 100 to the shared cache memory subsystem 132 and processing units 110a-110d and 120. I/O devices include many variations of computer peripheral devices.

In one embodiment, system communication logic 116 is a system bus. In another embodiment, processing node 110 incorporates a Northbridge system bus controller in logic 116 in order to couple processing units 115a-115b to an off-chip memory, input/output (I/O) devices, other off-chip processors such as a graphics processing unit (GPU), another type of single-instruction-multiple-data (SIMD) core, a digital signal processor (DSP), other general-purpose processors, and so forth. In such an embodiment, system communication logic 116 replaces or incorporates the functionality of memory controller 120 and interface logic 140.

In one embodiment, logic 116 incorporates both a Northbridge and a Southbridge system bus controller. A Northbridge protocol is used to couple processing units 115a-115b to off-chip memory and a GPU. A Southbridge protocol is used to couple processing units 115a-115b to I/O Devices, a real time clock, a power management unit, or other. One example of such an embodiment of logic 116 includes the AMD-762™ Northbridge system controller and the AMD-768™ Southbridge peripheral bus controller.

In yet another embodiment, processing node 110 is one socket of a multi-socket system. System communication logic 116 incorporates packet-processing logic in such an embodiment. Generally speaking, system communication logic 116 is configured to respond to control packets received on the links to which the processing node 110 is coupled, to generate control packets in response to processor cores 112a-112b and/or cache memory subsystems 114a-114b, to generate probe commands and response packets in response to transactions selected by the memory controller 120 for service, and to route packets for which node 110 is an intermediate node to other nodes through interface logic 140. Interface logic 140 includes logic to receive packets and synchronize the packets to an internal clock used by packet processing logic within logic 116.

Figure 2:
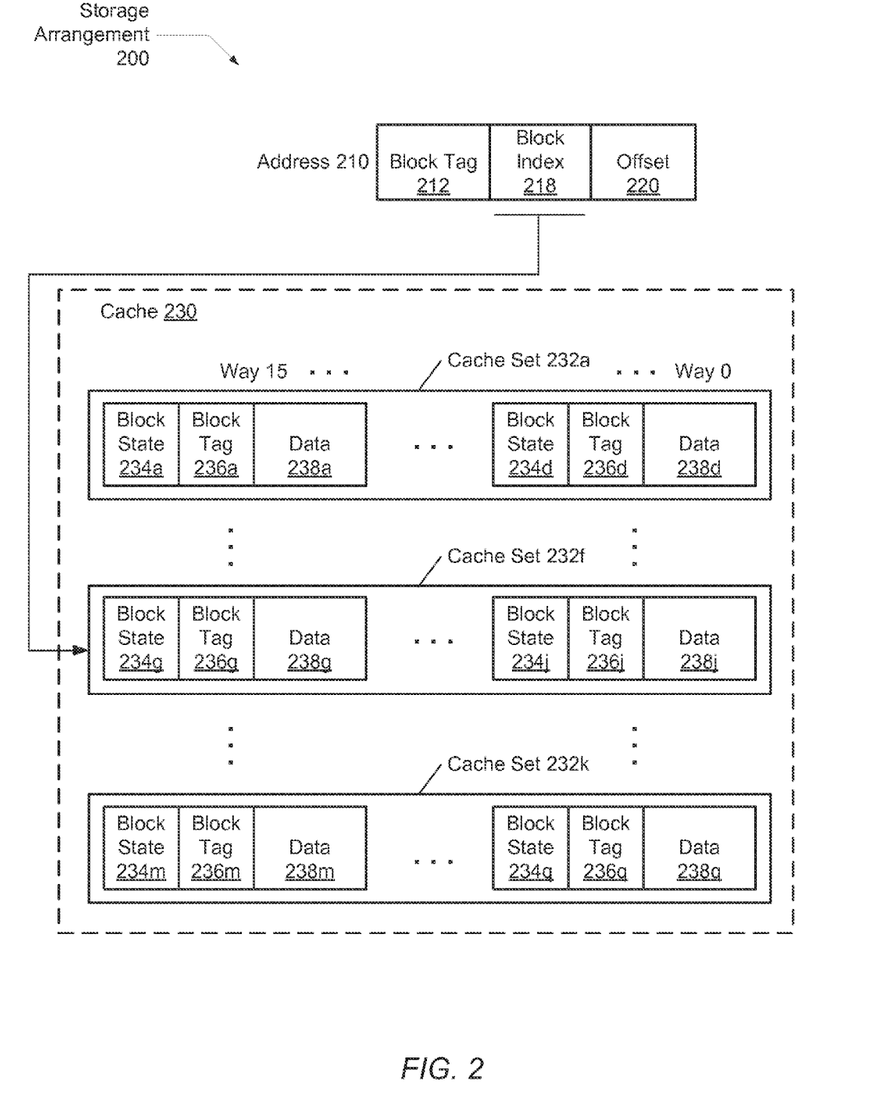
FIG. 2 is a generalized block diagram of one embodiment of a cache data storage arrangement.

Data is stored within an array of a shared cache, such as shared cache memory 118, in various manners. For example, FIG. 2 illustrates one embodiment of a storage arrangement 200 in which data are stored using a 16-way set-associative cache organization. A different number of ways, such as 4-way, 8-way, or other, within the set-associative cache is chosen. Alternatively, a fully associative or direct-mapped implementation is used. A given one of the cache sets 232a-232k is selected from other sets by a block index 218 portion of an address 210 used to access the cache 230. A cache block hit occurs when the block tag 212 and a given one of the tags 236a-236m contain a same value and a corresponding one of the block states 234a-234m designates predetermined match values such as a valid cache block.

In one embodiment, the data portions 238a-238m of a cache line, or cache block, within the cache 230 are configured to store 64 bytes. Other sizes are possible and contemplated. In various embodiments, each of the 16 ways of cache 230 also store state information. A given one of the block states 234a-234m comprises at least one or more of the following: a valid bit, a cache block owner encoding that indicates the source which owns the corresponding cache block, Least Recently Used (LRU) eviction information used in association with a cache replacement algorithm employed by a cache controller, an indication that designates a cache coherency state such as modified, exclusive, owned, shared, and invalid; a process ID and/or a thread ID; a node ownership ID; a clean/dirty state; and so forth. Other included state information is possible and contemplated.

A given one of the block tags 236a-236m is used to determine which of the 16 cache lines are being accessed within a chosen one of the cache sets 232a-232m. In addition, offset 230 of address 210 is used to indicate a specific byte or word within a cache line. A given one of the cache sets 232a-232m is chosen by the block index 218 of address 210. Although the block state and the block tag is stored in contiguous bits with the data within each cache way, in one embodiment, the block state and the block tag is stored in a separate array, rather than in a same array as the data.

Figure 3:
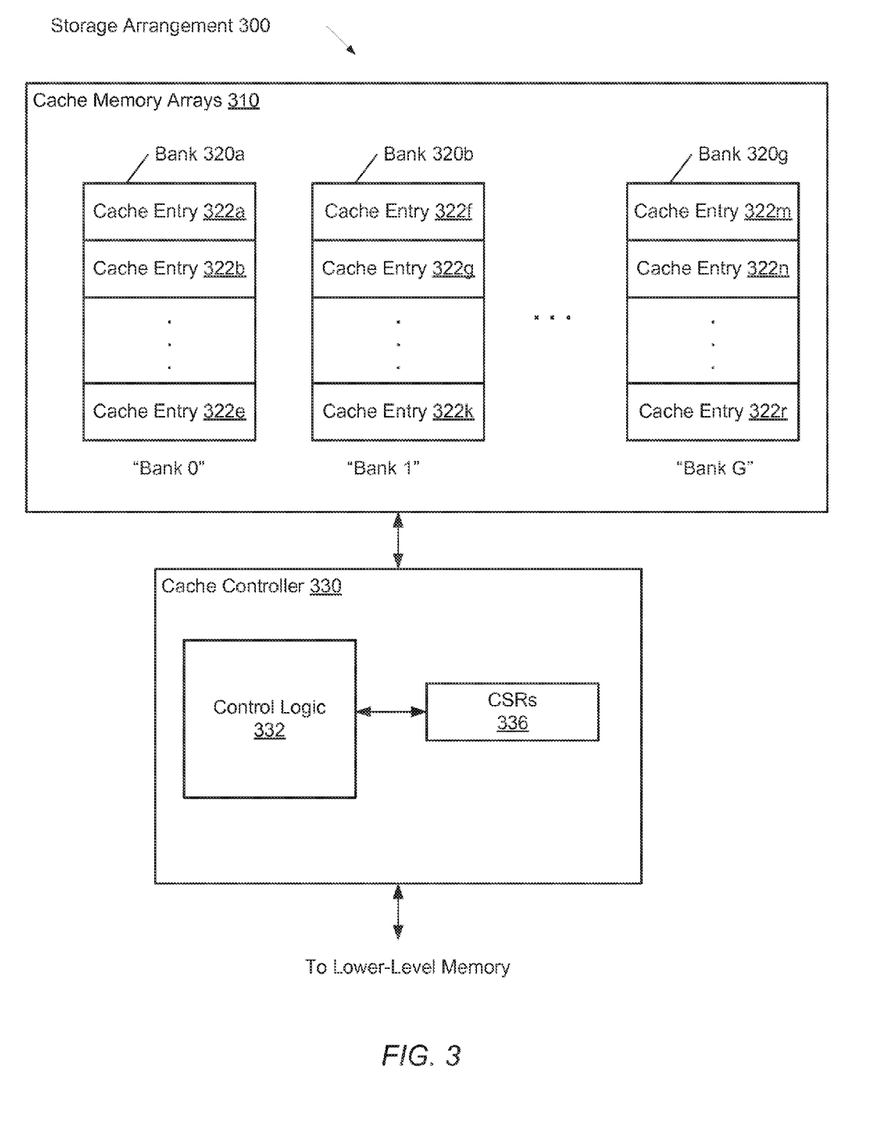
FIG. 3 is a generalized block diagram of another embodiment of a cache data storage arrangement.

Turning now to FIG. 3, a generalized block diagram illustrating another embodiment of a cache storage arrangement 300 is shown. As shown, cache 310 includes banks 320a-320g. The number of banks varies from one embodiment to the next. Each of the banks includes multiple entries. For example, bank 320a includes entries 322a-322e, bank 320b includes entries 322f-322k and bank 320g includes entries 322m-322r. In some embodiments, each one of the banks 320a-320g has a same storage capacity. In other embodiments, one or more of the banks 320a-320g has less or more storage capacity than other ones of the banks 320a-320g. Additionally, each of a number of sets in a set-associative cache is distributed across the banks 320a-320g.

Each of the banks 320a-320g of the cache 310 is designated for storing data of a given data type. The type corresponds to a property of cached data as previously described. In some embodiments, each one of the banks 320a-320g corresponds to a given one of multiple nodes in a multi-node system. One of the banks 320a-320g corresponds to data associated with a home or local node. The other banks of the banks 320a-320g correspond to data associated with remote nodes in the system. For example, the cache 310 includes eight banks with one bank for home or local data and seven banks for data associated with seven remote nodes. In some embodiments, each one of the banks 320a-320g transitions to an inactive power mode, such as being powered down, independent of the other banks.

The arrangement of cache 310 with multiple partitions, such as banks 320a-320g, allows for efficient limiting of and searching for cache lines with a given property or type. In particular, the cache controller 330 associated with cache 310 concurrently searches for cache lines with a given type in different banks. The cache controller 330 includes control logic 332 for performing several actions. These actions include determining a limit of an amount of data of a given type to be allocated in a given one of the banks 320a-320g, selecting one of the banks 320a-320g for allocating data, determining when each one of the banks 320a-320g is available, determining where to store data of a given type when a designated one of the banks 320a-320g is unavailable, selecting between bypassing and writing through data of a given type meant to be stored in a bank that is currently inactive when a corresponding write access request is received, performing steps to allocate recently received data of a given type in a given one of the banks 320a-320g and maintain an associated limit when the associated limit is reached, and so forth.

The time spent searching for cache lines of a given type arranged in a manner similar to cache 310 is less than that spent searching all lines in the cache 310. In one embodiment, configuration and status registers (CSRs) 336 is used to store programmable encoded values in order to control the allocation space for each one of the banks 320a-320g. For example, a limit of an amount of data of a given type stored in a given one of the banks 320a-320g is programmed. Additionally, the CSR's 336 stores values used to determine whether to bypass or write through modified data in a write access request when an originally assigned bank is currently inactive. An inactive power mode is a low power mode or a powered down state wherein the corresponding bank is unavailable for accesses.

Without limiting the number of cache lines in the banks 320a-320g, the writeback operations for a large number of cache lines of a given type significantly increases the latency to transition from an active mode to an inactive power mode or vice-versa. The steps of searching for the cache lines of the given type and invalidating and/or writing back the cache lines of the given type consumes an appreciable amount of time.

The cache controller 330 receives a memory allocation request for local data that is designated to be stored in bank 320a, which is also referred to as Bank 0, and determines Bank 0 is unavailable. The cache controller 330 allocates the data in another available bank, such as bank 320b, which is also referred to as Bank 1. The Bank 0 is designated to store data for the local home node in a multi-node system. The Bank 1 is designated to store data for a given remote node in the multi-node system.

The local data in the received memory allocation request is considered "native" data for Bank 0, since the local node state is the same for each of the local data and the Bank 0. The local data is considered "non-native" data for Bank 1, since the local node state of the data does not match the remote node state for the Bank 1. This allocation of the non-native data occurs despite the designated earlier assignments. For received write access requests for local data that is designated to be stored in Bank 0, which is inactive, the control logic 332 in the cache controller 330 selects between bypassing and writing through the received local data in Bank 1. The selection is based on the criteria listed earlier. Bypassing or writing through the non-native data in Bank 1 maintains non-native data with a clean state in Bank 1.

In response to determining Bank 0 is available again, the control logic 332 in the cache controller 330 may not need to migrate or write back any dirty non-native data in Bank 1, since all non-native data stored in Bank 1 is clean. Therefore, both the latency to start using Bank 0 and traffic on memory buses are significantly reduced.

Figure 4:
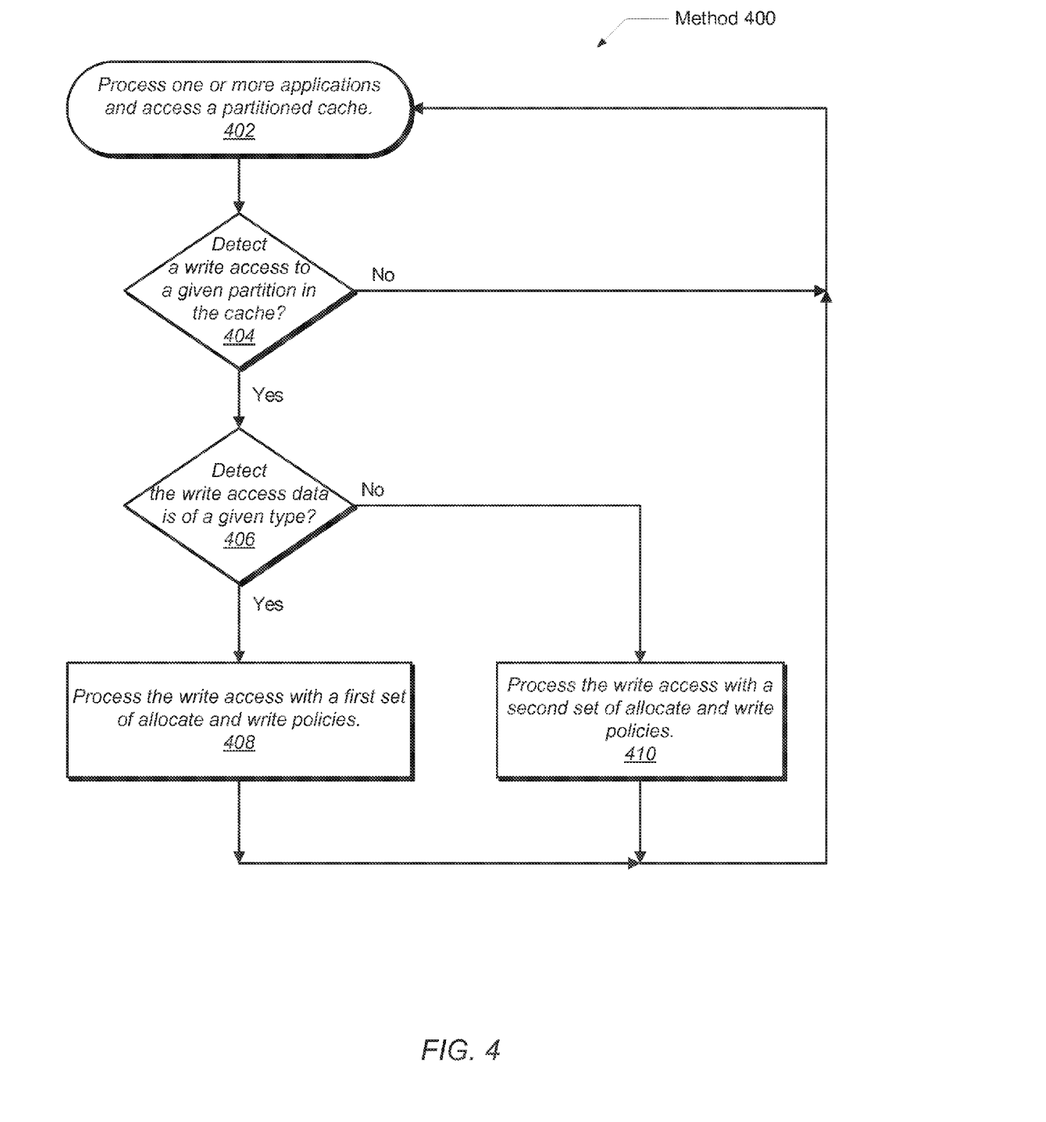
FIG. 4 is a generalized flow diagram of one embodiment of a method for efficiently limiting storage space in a cache for data of a given type.

Referring now to FIG. 4, a generalized flow diagram of one embodiment of a method 400 for efficiently limiting storage space in a cache for data of a given type is illustrated. In various embodiments, the components embodied in the computing system and cache storage arrangements described above generally operate in accordance with method 400. Additionally, program instructions, or generally software, executable by a processor causes operation in accordance with method 400. For purposes of discussion, the steps in this embodiment are shown in sequential order. However, some steps occur in a different order than shown, some steps are performed concurrently, some steps are combined with other steps, and some steps are absent in another embodiment.

In block 402, instructions of one or more software applications are processed and a partitioned cache is accessed. Generally speaking, instructions are fetched, decoded, renamed, executed and retired. In some examples, the instructions belong to a single software thread, or alternatively, belong to one of multiple threads. The partitions include particular ways and/or sets of a set-associative cache, banks of a multi-bank cache, and so forth. The partitioned cache is accessed for data, instructions, or both. Both prior to and during processing, one or more CSRs are programmed to store given values, or is reset, in order to store given initial values. The CSRs are used to store thresholds and static fraction values for reducing data of a given type stored in a given partition in the partitioned cache.

If a write access request for data in a given partition of the multiple partitions of the cache is received (conditional block 404), then status and other metadata corresponding to the store data is inspected to determine whether the store data is of a given type. Again, the type includes a cache entry valid state, dirty and clean cache states, home or local node and remote node states, bank identifiers (ID's), such as bank IDs corresponding to local and one or more remote nodes; one of multiple cache coherence states, process or processor owner identifiers (ID's), thread ID's, system-level transaction ID's, shared and private states, instruction type and data type, and so forth. The type may also include a combination of two or more of the examples.

The first type is a data type that is originally assigned for storage in the given partition of the partitioned cache. For example, the given partition is originally assigned to store data corresponding to a local node. Data of the first type is considered "native" data for the given partition. If the store data for the write access request is found to be of the first type, which is "native" for the given partition (conditional block 406), then in block 408, the write access request is processed with a first set of allocate and write policies. In some examples, the first set of policies includes a cache writeback policy and an allocate-on-miss policy.

If the store data for the write access request is not found to be of the first type, which is "non-native" for the given partition (conditional block 406), then in block 410, the write access request is processed with a second set of allocate and write policies. The second set of policies is different from the first set of policies. In various embodiments, the second set of policies is used only for non-native data for the given partition. The second set of policies attempts to limit an amount of data in the given partition that is not of the first type. The given partition receives a read access request or a write access request for non-native data when particular conditions are satisfied. For example, one or more partitions are made unavailable due to a low-power mode. Data for the one or more partitions is reassigned to other active partitions.

Figure 5:
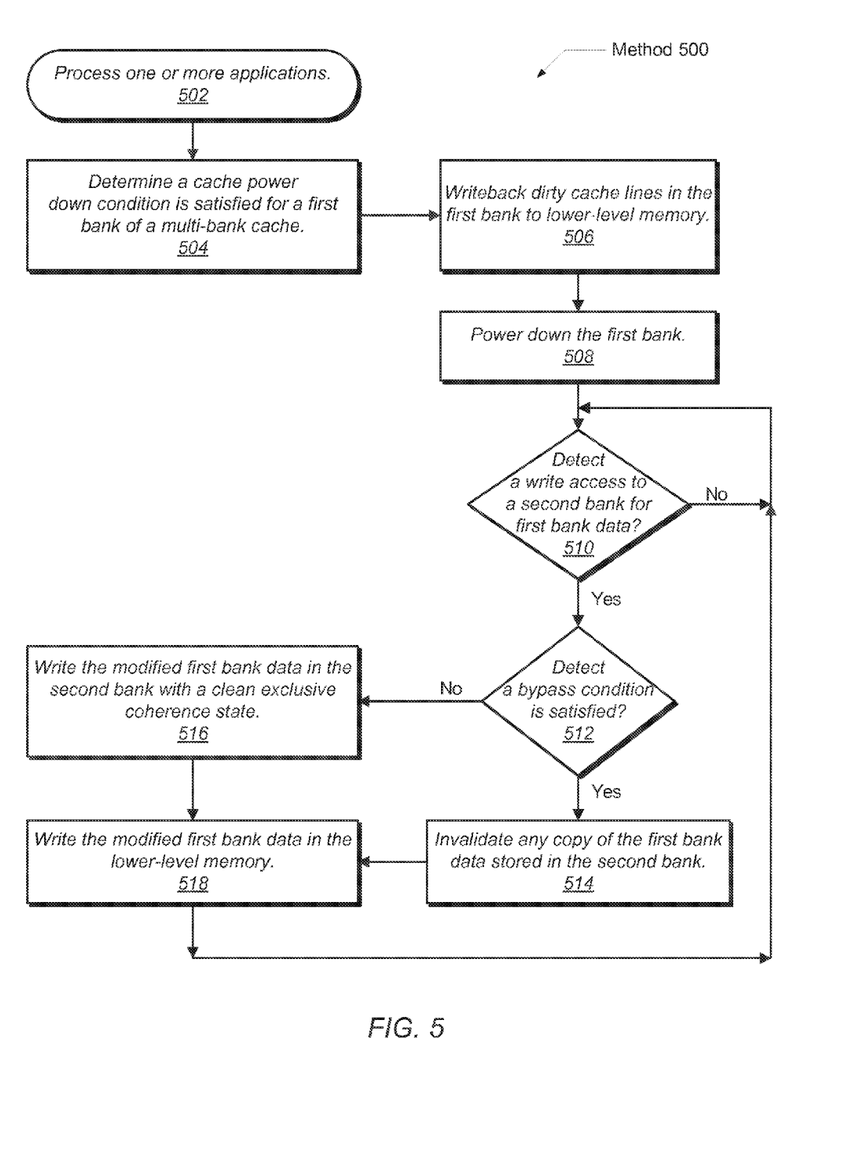
FIG. 5 is a generalized flow diagram of another embodiment of a method for efficiently limiting storage space in a cache for data of a given type.

Referring now to FIG. 5, a generalized flow diagram of another embodiment of a method 500 for efficiently limiting storage space in a cache for data of a given type is illustrated. In various embodiments, the components embodied in the computing system and cache storage arrangements described above generally operate in accordance with method 500. Additionally, program instructions, or generally software, executable by a processor causes operation in accordance with method 500. For purposes of discussion, the steps in this embodiment are shown in sequential order. However, in other embodiments, some steps occur in a different order than shown, some steps are performed concurrently, some steps are combined with other steps, and some steps are absent in another embodiment.

In block 502, instructions of one or more software applications are processed and a given cache is accessed. Both prior to and during processing, one or more CSRs are programmed to store given values or reset in order to store given initial values. The CSRs are used to store thresholds and static fraction values for reducing dirty non-native data stored in a given partition in the given cache. In various embodiments, the partition is a bank of a multi-bank cache. For example, the stored values are used for selecting between bypassing and writing through non-native data included in write access requests at the given partition or bank.

In block 504, power management logic determines a cache power down condition is satisfied for an identified first bank of the given cache. The power management logic sends notification to control logic within a corresponding cache controller for the given cache. In block 506, dirty data stored in cache lines is written back to lower-level memory. In block 508, the first bank is powered down or otherwise made inactive. While the first bank is inactive, an active second bank is selected to receive memory access requests targeting the first bank.

If a write access request for the first bank is received and now targeting the second bank (conditional block 510), then a bypass condition is determined. The bypass condition is based on several criteria as listed earlier. If the bypass condition is satisfied or exceeds a corresponding threshold (conditional block 512), then in block 514, any copy of data corresponding to an address in the write access request stored in the second bank is invalidated. In block 518, the modified data in the write access request is sent to lower-level memory to be stored. If the bypass condition is not satisfied or does not exceed a corresponding threshold (conditional block 512), then in block 516, the modified data in the write access request is stored in the second bank in a clean state. The clean state indicates a copy of data in each of the second bank and the lower-level memory is the same. Following, in block 518, the modified data in the write access request is sent to lower-level memory to be stored.

Figure 6:
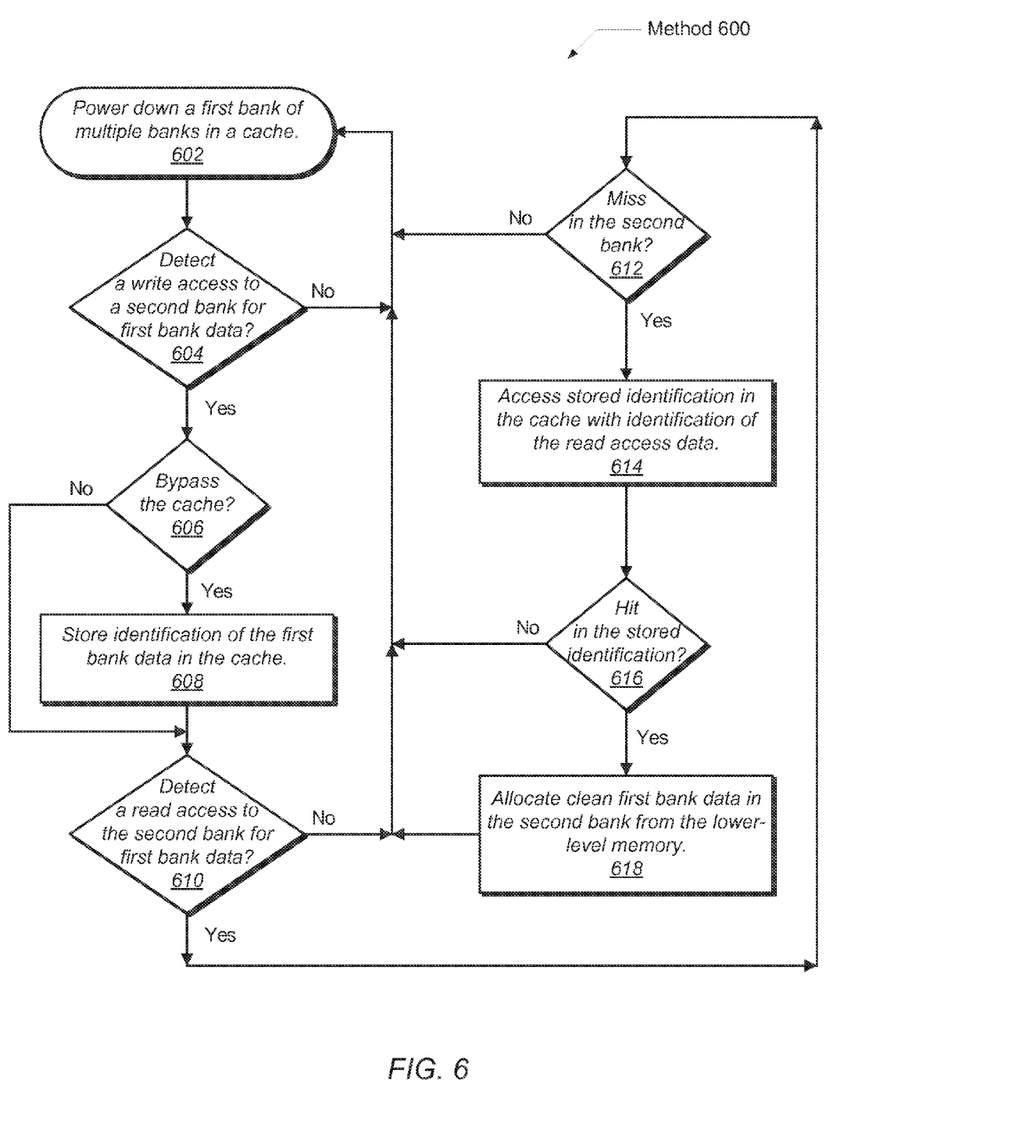
FIG. 6 is a generalized flow diagram of yet another embodiment of a method for efficiently limiting storage space in a cache for data of a given type.

Turning now to FIG. 6, a generalized flow diagram of yet another embodiment of a method 600 for efficiently limiting storage space in a cache for data of a given type is illustrated. Similar to methods 400 and 500 and the below methods, the components embodied in the computing system and cache storage arrangements described above may generally operate in accordance with method 600. Additionally, program instructions, or generally software, executable by a processor causes operation in accordance with method 600 and the below methods. For purposes of discussion, the steps in this embodiment are shown in sequential order. However, in other embodiments, some steps occur in a different order than shown, some steps are performed concurrently, some steps are combined with other steps, and some steps are absent.

In block 602, a first bank of multiple banks in a given cache is powered down or otherwise made inactive. If a write access request for the inactive first bank is received and now targeting an active second bank (conditional block 604), then a bypass condition is determined. The non-native data in the write access request bypasses the second bank. Alternatively, the non-native data in the write access request writes through the second bank to lower-level memory. If the bypass condition is satisfied or exceeds a threshold, then the second bank is bypassed. If the second bank is bypassed (conditional block 606), then in block 608, identification of the non-native data in the write access request is stored. The identification includes one or more of a cache tag, a cache index, other portions of a corresponding address, and cache status information such as the examples that is stored in the cache state 234a-234m described earlier. In some embodiments, the identification is stored in a static buffer. In other embodiments, the identification is stored in a first-in-first-out (FIFO) buffer.

If a read access request for the inactive first bank is received and now targeting the active second bank (conditional block 610), and the read access request misses in the second bank (conditional block 612), then in block 614, the stored identification is accessed with identification information in the read access request. If a hit occurs in the stored identification (conditional block 616), then in block 618, a copy of the non-native data corresponding to the read access request is allocated in the second bank from the lower-level memory. The allocated non-native data is stored with a clean state. The coherence state is exclusive or shared depending on whether other processor cores have a shared copy of the non-native data.

Figure 7:
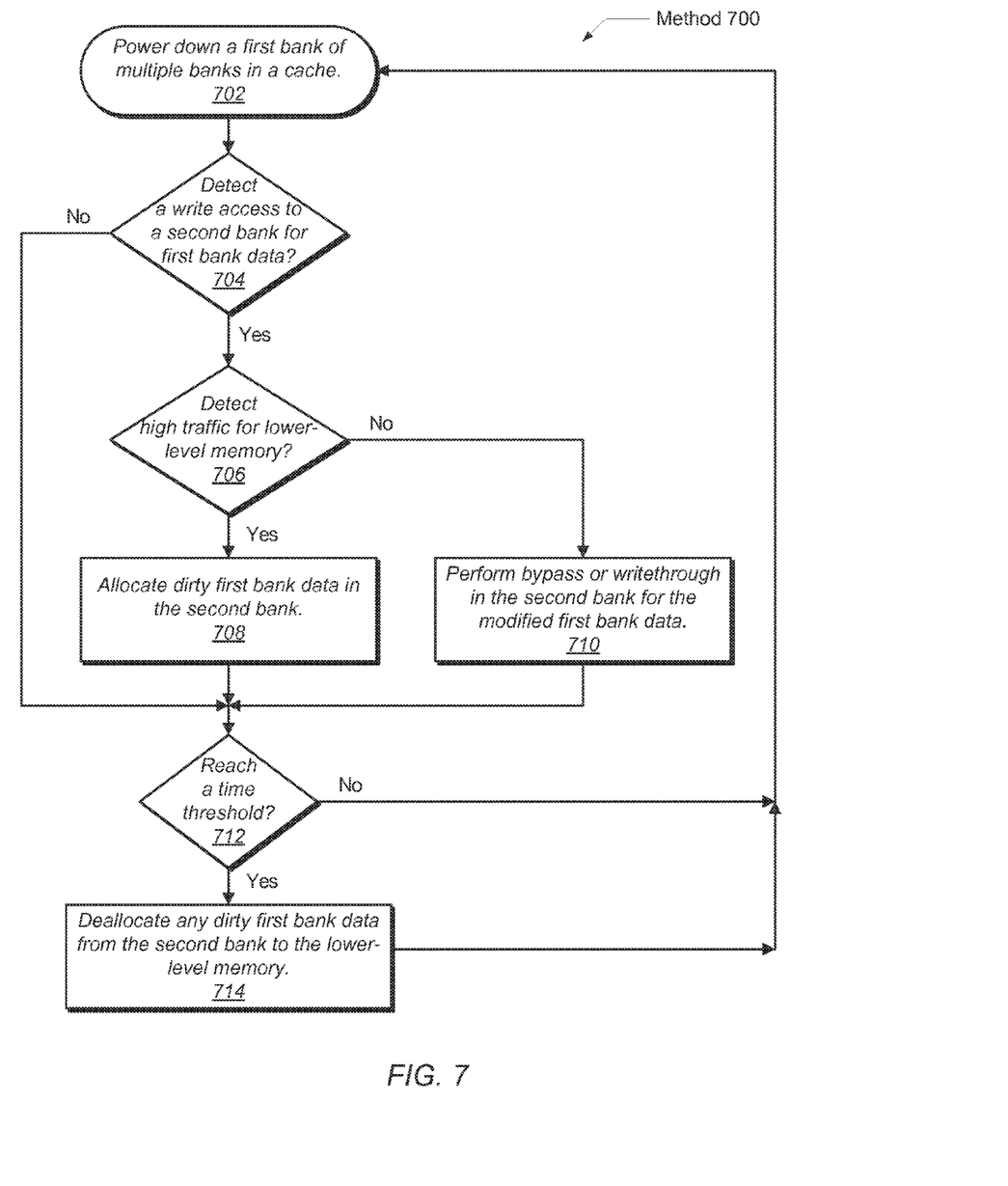
FIG. 7 is a generalized flow diagram of yet another embodiment of a method for efficiently limiting storage space in a cache for data of a given type.

Turning now to FIG. 7, a generalized flow diagram of yet another embodiment of a method 700 for efficiently limiting storage space in a cache for data of a given type is illustrated. For purposes of discussion, the steps in this embodiment are shown in sequential order. However, in other embodiments, some steps occur in a different order than shown, some steps are performed concurrently, some steps are combined with other steps, and some steps are absent.

In block 702, a first bank of multiple banks in a cache is powered down or otherwise made inactive. An active second bank is selected to receive memory access requests targeting the inactive first bank. If a write access request for the inactive first bank is received (conditional block 704), and high memory access traffic is detected for the lower-level memory (conditional block 706), then in block 708, the non-native data in the write access request is allocated in the second bank. The non-native data is allocated with a dirty state. A timer is maintained in the control logic or CSRs of a cache controller. The timer starts counting in response to any dirty non-native data is written into the second bank. In some embodiments, a time threshold is additionally stored in the CSRs. In some embodiments, the current value stored in the timer is compared against the time threshold.

If a write access request for the inactive first bank is received (conditional block 704), and high memory access traffic is not detected for the lower-level memory (conditional block 706), then in block 710, bypass or write through of the non-native data in the write access request is performed. The selection between bypass and write through is based on criteria as described earlier. If the current value stored in the timer reaches a corresponding threshold (conditional block 712), then in block 714, the second bank is "scrubbed" of any dirty non-native data. In some embodiments, the second bank is searched and any found dirty non-native data is written to the lower-level memory and deallocated. In other embodiments, the second bank is searched, any found dirty non-native data is written to the lower-level memory, and the dirty non-native data is transitioned to clean state and remain in the second bank.

It is noted that the above-described embodiments comprises software. In such an embodiment, the program instructions that implement the methods and/or mechanisms is conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage. Generally speaking, a computer accessible storage medium includes any storage media accessible by a computer during use to provide instructions and/or data to the computer. For example, a computer accessible storage medium includes storage media such as magnetic or optical media, e.g., disk (fixed or removable), tape, CD-ROM, or DVD-ROM, CD-R, CD-RW, DVD-R, DVD-RW, or Blu-Ray. Storage media furthers include volatile or non-volatile memory media such as RAM (e.g. synchronous dynamic RAM (SDRAM), double data rate (DDR, DDR2, DDR3, etc.) SDRAM, low-power DDR (LPDDR2, etc.) SDRAM, Rambus DRAM (RDRAM), static RAM (SRAM), etc.), ROM, Flash memory, non-volatile memory (e.g. Flash memory) accessible via a peripheral interface such as the Universal Serial Bus (USB) interface, etc. Storage media includes microelectromechanical systems (MEMS), as well as storage media accessible via a communication medium such as a network and/or a wireless link.

Additionally, program instructions comprises behavioral-level description or register-transfer level (RTL) descriptions of the hardware functionality in a high level programming language such as C, or a design language (HDL) such as Verilog, VHDL, or database format such as GDS II stream format (GDSII). In some cases the description is read by a synthesis tool, which synthesizes the description to produce a netlist comprising a list of gates from a synthesis library. The netlist comprises a set of gates, which also represent the functionality of the hardware comprising the system. In various examples, the netlist is then placed and routed to produce a data set describing geometric shapes to be applied to masks. The masks are used in various semiconductor fabrication steps to produce a semiconductor circuit or circuits corresponding to the system. Alternatively, the instructions on the computer accessible storage medium are the netlist (with or without the synthesis library) or the data set, as desired. Additionally, the instructions are utilized for purposes of emulation by a hardware based type emulator from such vendors as Cadence®, EVE®, and Mentor Graphics®.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A computing system comprising:
   a cache array comprising a plurality of partitions for storing data, wherein a first partition of the plurality of partitions is powered down;
   a cache controller coupled to the cache array, the cache controller being configured to:
      in response to receiving a write request to a second partition of the plurality of partitions for data to be stored in the first partition:
         determine a respective bypass condition for the data; and
         invalidate any copy of the data stored in the second partition responsive to determining the respective bypass condition exceeds a first threshold.

2. The computing system as recited in claim 1, wherein in further response to receiving the write request, the cache controller is further configured to store the data with a clean state in the second partition responsive to determining the respective bypass condition does not exceed the first threshold.

3. The computing system as recited in claim 2, wherein to determine the respective bypass condition for the data, the cache controller is further configured to maintain a static fraction of write requests having data bypass the second bank.

4. The computing system as recited in claim 2, wherein to determine the respective bypass condition for the data, the cache controller is further configured to measure an amount of memory access request traffic for the cache array.

5. The computing system as recited in claim 2, wherein to determine the respective bypass condition for the data, the cache controller is further configured to maintain a count of misses in the second partition for read and write requests to the first partition.

6. The computing system as recited in claim 2, wherein the computing system further comprises a lower-level memory coupled to the cache controller, wherein the cache controller is further configured to:
   write the data in the lower-level memory; and
   in response to determining an amount of memory access request traffic for the lower-level memory exceeds a second threshold, store the data in the second partition.

7. The computing system as recited in claim 6, wherein the cache controller is further configured to:
   maintain a timer count since any data indicated to be stored in the powered down first partition has been written into the second partition; and
   evict from the second partition to the lower-level memory at least dirty data indicated to be stored in the powered down first partition in response to determining the timer count exceeds a third threshold.

8. The computing system as recited in claim 1, wherein the computing system further comprises a lower-level memory coupled to the cache controller, wherein the cache controller is further configured to store identification of any data indicated to be stored in the powered down first partition and bypassed in the second partition during a write request.

9. The computing system as recited in claim 8, wherein the cache controller is further configured to allocate data in a clean state from the lower-level memory to the second partition in response to a read request for the data missing in the second partition and identification for the data is stored in the cache controller from an earlier bypass of the second partition.

10. A method executable by at least one processor in a computing system, the method comprising:
   in response to receiving a write request to a second partition of a plurality of partitions in a cache array for data indicated to be stored in a powered down first partition:
      determining a respective bypass condition for the data;
      invalidating any copy of the data stored in the second partition responsive to determining the respective bypass condition exceeds a first threshold.

11. The method as recited in claim 10, wherein in further response to receiving the write request, the method further comprises storing the data with a clean state in the second partition responsive to determining the respective bypass condition does not exceed the first threshold.

12. The method as recited in claim 11, wherein to determine the respective bypass condition for the data, the method further comprises maintaining a static fraction of write requests having data bypass the second bank.

13. The method as recited in claim 11, wherein the method further comprises:
 writing the data in a lower-level memory coupled to the cache array; and
 in response to determining an amount of memory access request traffic for the lower-level memory exceeds a second threshold, storing the data in the second partition.

14. The method as recited in claim 13, wherein the method further comprises:
 maintaining a timer count since any data indicated to be stored in the powered down first partition has been written into the second partition; and
 evicting from the second partition to the lower-level memory at least dirty data indicated to be stored in the powered down first partition in response to determining the timer count exceeds a third threshold.

15. The method as recited in claim 10, wherein the method further comprises storing identification of any data indicated to be stored in the powered down first partition and bypassed in the second partition during a write request.

16. The method as recited in claim 15, wherein the method further comprises allocating data in a clean state from a lower-level memory coupled to the cache array to the second partition in response to a read request for the data missing in the second partition and identification for the data is stored from an earlier bypass of the second partition.

17. A cache controller comprising:
 a first interface coupled to a cache array comprising a plurality of partitions for storing data, wherein a first partition of the plurality of partitions is powered down;
 a second interface coupled to a lower-level memory; and
 a control unit; and
 wherein in response to receiving a write request to a second partition of the plurality of partitions for data indicated to be stored in the powered down first partition, the control unit is configured to:
  determine a respective bypass condition for the data; and
  invalidate any copy of the data stored in the second partition responsive to determining the respective bypass condition exceeds a first threshold.

18. The cache controller as recited in claim 17, wherein in further response to receiving the write request, the control unit is further configured to store the data with a clean state in the second partition responsive to determining the respective bypass condition does not exceed the first threshold.

19. The cache controller as recited in claim 18, wherein the control unit is further configured to:
 write the data in the lower-level memory; and
 in response to determining an amount of memory access request traffic for the lower-level memory exceeds a second threshold, store the data in the second partition.

20. The cache controller as recited in claim 19, wherein the control unit is further configured to:
 maintain a timer count since any data indicated to be stored in the powered down first partition has been written into the second partition; and
 evict from the second partition to the lower-level memory at least dirty data indicated to be stored in the powered down first partition in response to determining the timer count exceeds a third threshold.

* * * * *